(12) United States Patent
Sandhu et al.

(10) Patent No.: US 8,449,180 B2
(45) Date of Patent: May 28, 2013

(54) TEMPERATURE SENSOR

(75) Inventors: Adarsh Sandhu, Tokyo (JP); Takuya Yamamura, Tokyo (JP); Makoto Taoda, Tokyo (JP); Zaki Primadani, Tokyo (JP)

(73) Assignee: Adarsh Sandhu, Tokyo (JP)

( * ) Notice: Subject to any disclaimer, the term of this patent is extended or adjusted under 35 U.S.C. 154(b) by 694 days.

(21) Appl. No.: 12/161,760

(22) PCT Filed: Jan. 19, 2007

(86) PCT No.: PCT/JP2007/000022
§ 371 (c)(1),
(2), (4) Date: May 4, 2010

(87) PCT Pub. No.: WO2007/086238
PCT Pub. Date: Aug. 2, 2007

(65) Prior Publication Data
US 2010/0226409 A1    Sep. 9, 2010

Related U.S. Application Data

(60) Provisional application No. 60/763,721, filed on Jan. 31, 2006.

(30) Foreign Application Priority Data
Jan. 27, 2006 (JP) ................... 2006-019488

(51) Int. Cl.
*G01K 7/16* (2006.01)
*G01K 11/00* (2006.01)

(52) U.S. Cl.
USPC ............................ 374/185; 374/130; 374/161

(58) Field of Classification Search
USPC .......................................... 374/185, 130, 161
See application file for complete search history.

(56) References Cited

U.S. PATENT DOCUMENTS

| | | | | |
|---|---|---|---|---|
| 4,403,871 | A * | 9/1983 | Feller ................................. | 374/1 |
| 4,590,507 | A * | 5/1986 | Capasso et al. ................ | 257/185 |
| 6,826,320 | B2 * | 11/2004 | Deliwala ......................... | 385/14 |
| 7,786,503 | B2 * | 8/2010 | D'Evelyn et al. .............. | 257/103 |
| 8,076,699 | B2 * | 12/2011 | Chen et al. ...................... | 257/194 |
| 2010/0188069 | A1 * | 7/2010 | Ren et al. ....................... | 324/71.5 |
| 2011/0074381 | A1 * | 3/2011 | Ren et al. ....................... | 324/71.5 |

FOREIGN PATENT DOCUMENTS

| | | |
|---|---|---|
| JP | 08-032087 A | 2/1996 |
| JP | 2004-294322 A | 10/2004 |

OTHER PUBLICATIONS

International Search Report for PCT/JP2007/000022, mailed Apr. 24, 2007.

* cited by examiner

*Primary Examiner* — Christopher Fulton
(74) *Attorney, Agent, or Firm* — Foley & Lardner LLP

(57) ABSTRACT

This invention is to provide a temperature sensor which can measure a precise temperature of a minute region, which can measure a temperature in a wide range from a low temperature to a high temperature, and which has a simple structure. The temperature sensor comprises a two-dimensional electron gas. A resistance of the two-dimensional electron gas is used to measure a temperature. The two-dimensional electron gas may have a heterostructure selected from the group consisting of an AlGaN/GaN system, an AlGaAs/GaAs system, an InAs/GaAs system, an InAs/GaSb/AlSb system, a SiGe/Si system, a SiC/Si system, a CdTe/HgTe/CdTe system, an InGaAs/InAlAs/InP system, and nanocrystalline silicon.

20 Claims, 3 Drawing Sheets

TEMPERATURE SENSOR

TECHNICAL FIELD

The present invention relates to a temperature sensor, and more particularly to a temperature sensor utilizing a change in resistance due to temperature.

BACKGROUND ART

A platinum resistance temperature detector, a thermistor utilizing resistance-temperature characteristics of a semiconductor, a thermocouple using two kinds of metals, etc. are known as temperature sensors, specifically these are examples of contact-type temperature sensors. There are also many kinds of semiconductor temperature sensors utilizing temperature characteristics of the base-to-emitter voltage of transistors. Such a sensor is disclosed in, for example, Japanese Patent Application Kokai Publication No. 2004-294322.

DISCLOSURE OF INVENTION

Technical Problem

However, since the detection region of a platinum resistance temperature sensor is large and it is not possible to measure the temperature of small areas. Also, even though the sensitivity of a thermistor is good, it has deficiency because the linearity of the change of the resistance with temperature characteristics is poor and the lowest operating temperature is limited to about −50 degrees Celsius. Further, a thermocouple has problems in which the structure of the temperature sensor becomes increasingly complex because a reference junction apart from the measuring junction, that must be kept at a constant temperature, is indispensable.

Also, since the temperature sensitive region of a conventional temperature sensor does not exist adjacent to the contact region of the sensor, but exists in an inner region, the contact region of the sensor and the temperature sensitive region used to actually measure the temperature are located at different positions. Therefore, conventional sensors have the problem that they cannot measure the precise temperature of a region to be measured. Further, the measurement environment of a conventional sensor may be limited because of its physical and chemical stability. Also, there is no sensor which achieves a wide operating temperature range from extremely low to extremely high temperatures.

An object of the present invention, therefore, is to overcome the problems existing in the prior art, and to provide a temperature sensor which can measure a precise temperature of a minute region, which can measure a temperature in a wide range from low to high temperature, and which has a simple structure.

Technical Solution

According to one aspect of the invention, there is provided a temperature sensor comprising a two-dimensional electron gas, a resistance of the two-dimensional electron gas being used to measure a temperature.

The temperature sensor may further comprise a protective film formed on a contact region of the temperature sensor.

The temperature sensor may be subjected to optical excitation.

The two-dimensional electron gas may have a heterostructure selected from the group consisting of an AlGaN/GaN system, an AlGaAs/GaAs system, an InAs/GaAs system, an InAs/GaSb/AlSb system, a SiGe/Si system, a SiC/Si system, a CdTe/HgTe/CdTe system, an InGaAs/InAlAs/InP system, and nanocrystalline silicon.

The two-dimensional electron gas may have a heterostructure of an AlGaN/GaN system, the temperature sensor further comprising a thin barrier layer provided between a supply layer and a smaller band gap layer than the supply layer of the heterostructure.

The temperature sensor may have a plurality of sensors disposed in a matrix form.

The temperature sensor may be constituted by a magnetic field transducer.

Advantageous Effects

According to the invention, a physically and chemically stable temperature sensor can be constituted by selecting appropriate materials, thereby having an advantage of being available under harsh environments. Since the temperature sensitive region is very close to a region to be measured, the invention also has an effect on being able to measure the precise temperature of the region to be measured. Further, the invention has an effect such that a temperature sensor having a very wide range operating temperature limit can be constituted by selecting appropriate materials. The temperature sensor of the present invention is sensitive because the change in resistance due to temperature is large. Also a simple structure is achievable because the temperature can be measured by measuring only a resistance.

EXPLANATION OF REFERENCE

1 Substrate
2 GaN layer
3 AlGaN layer
4 Two-dimensional electron gas
5 Thin barrier layer

BEST MODE FOR CARRYING OUT THE INVENTION

Now, a preferred embodiment of the invention is described with reference to the drawings. A temperature sensor of the present invention has a two-dimensional electron gas. Since a resistance of the two-dimensional electron gas changes depending on a temperature, the temperature can be measured by utilizing the change curve thereof.

Normally, electrical conductivity of semiconductors is enhanced by doping. Therefore, a change in resistance due to temperature is affected by both ionized impurity scattering and phonon scattering. The ionized impurity scattering largely affects the resistance at a low temperature, and the phonon scattering largely affects it at a high temperature. However, since both scattering mechanisms affect it at a room temperature, the resistance change due to the change in temperature is smaller. On the other hand, the two-dimensional electron gas is separated between the region to be doped and the region in which a current flows. Since there are no impurities in the region of the two-dimensional electron gas in which a current flows, a change in resistance of the two-dimensional electron gas due to temperature is affected by only the phonon scattering. Thus, a resistance change due to a change of temperature is sensitive even at a room temperature. Therefore, the temperature sensor of the present invention utilizing the two-dimensional electron gas with the above characteristics has high measurement sensitivity to temperature fluctuations.

Figure 1:
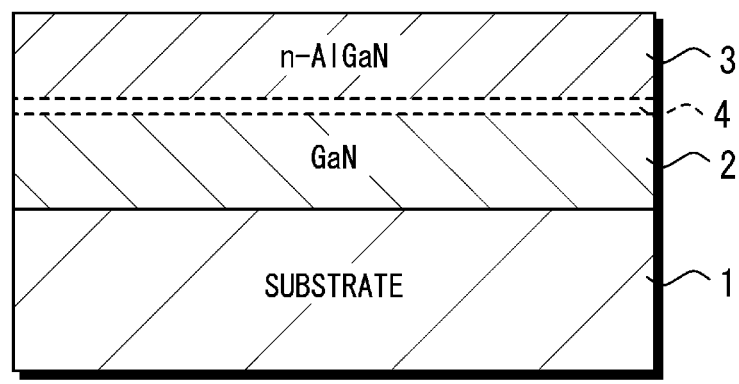
FIG. 1 is a schematic sectional view for describing the structure of the temperature sensor according to the invention.

Now, the temperature sensor of the present invention is described in more detail. FIG. 1 is a schematic sectional view of a structure of the temperature sensor according to the present invention. The sensor with a heterostructure of AlGaN/GaN as to the two-dimensional electron gas is shown in the illustrated example. GaN is a physically and chemically stable material and is a material that is durable under harsh environments. By using the two-dimensional electron gas of an AlGaN/GaN system having such GaN, the temperature sensor is achievable, which can be used from a low temperature to a high temperature, specifically, e.g., from about absolute zero temperature to about 600 degrees Celsius.

As shown in the figure, the temperature sensor of the present invention is formed as follows. First of all, a GaN layer 2 is deposited on a substrate 1 by crystal growth, etc. Next, AlGaN, for example, an n-type AlGaN layer 3 is deposited thereon by crystal growth, etc. Then, a two-dimensional electron gas 4 is formed at the interface between AlGaN and GaN. The temperature sensor of the present invention measures a temperature by measuring a resistance of the two-dimensional electron gas via ohmic contacts, etc. It should be understood that each layer of the temperature sensor may be formed by using any conventional methods or any methods to be developed in the future, and that it is not limited to the specific manufacturing process for the temperature sensor.

In FIG. 1, when the AlGaN layer 3 has a film thickness of, for example, about 30 nm, the two-dimensional electron gas 4 is positioned at a depth of about 30 nm from a surface of the temperature sensor. Therefore, since the temperature sensitive region of the temperature sensor according to the present invention is very close to a region to be measured, the invention can measure the precise temperature of the region to be measured. Also, the distance from the temperature sensitive region is short, so that the thermal conductivity is good and the response speed is high.

In the figure, the heterostructure of the AlGaN/GaN system is specifically shown as the two-dimensional electron gas, but the two-dimensional electron gas used in the present invention is not limited thereto. The two-dimensional electron gas may include a heterostructure, such as an AlGaN/GaN system, an AlGaAs/GaAs system, an InAs/GaAs system, an InAs/GaSb/AlSb system, a SiGe/Si system, a SiC/Si system, a CdTe/HgTe/CdTe system, an InGaAs/InAlAs/InP system, and nanocrystalline silicon. However, the two-dimensional electron gas of the temperature sensor according to the invention is not limited to the above materials, and any materials are applicable as long as the two-dimensional electron gas can be formed at the interface between disparate materials joined with each other having different band gaps.

Figure 2:
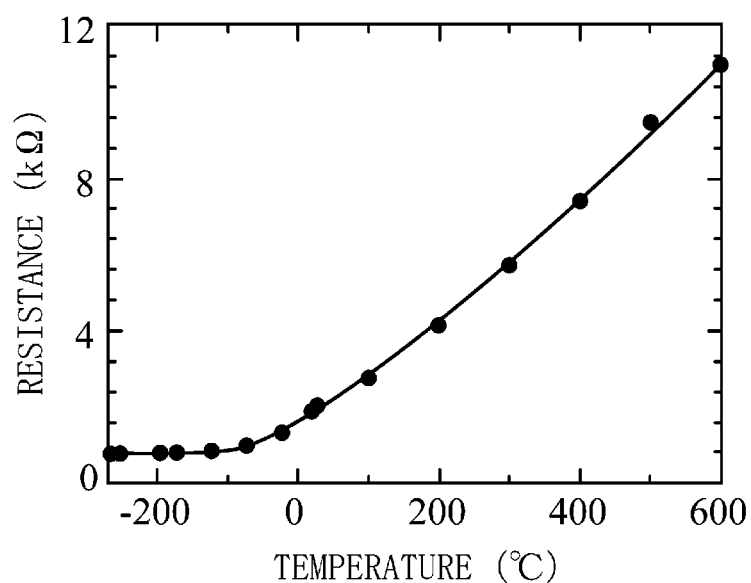
FIG. 2 is a graph showing resistance-temperature characteristics of the temperature sensor according to the invention, which uses AlGaN/GaN as the two-dimensional electron gas.

A graph relating to resistance-temperature characteristics of the temperature sensor according to the invention, which uses the heterostructure of AlGaN/GaN explained above, is shown in FIG. 2. As shown in the figure, the temperature sensor of the present invention has characteristics such that the resistance continues to increase within a range from about −263 degrees Celsius to about 600 degrees Celsius. Also, the change characteristics can easily be approximated by a cubic curve. Therefore, a temperature may be measured by using such change curve. Although the change width of the resistance is small for less than 0 degree Celsius, because a variation (a noise) of an output voltage at a low temperature is smaller than that at a high temperature, the temperature can be well measured even if the change width is small. Regarding the illustrated temperature range and resistance, those are variable in accordance with doping to the temperature sensor to be formed, therefore it should be understood that those are not limited to the illustrated example.

Figure 3:
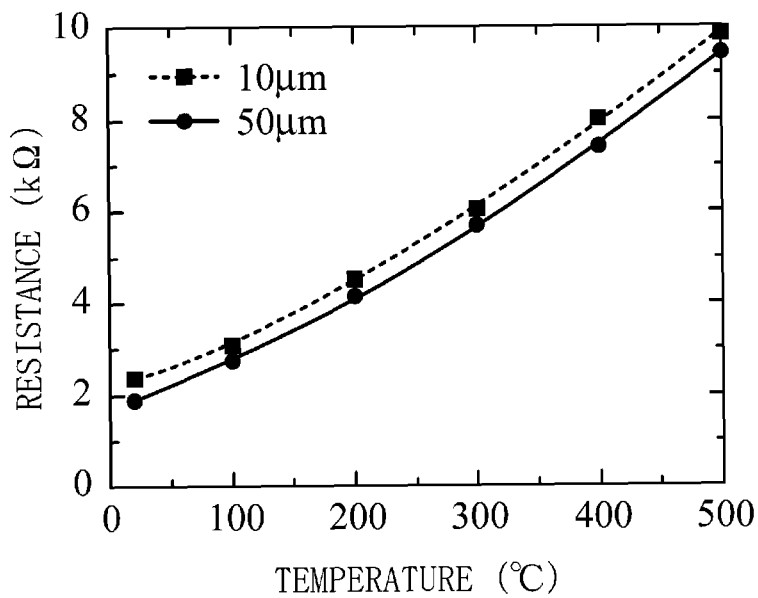
FIG. 3 is a graph showing resistance-temperature characteristics of the temperature sensor according to the invention, which uses AlGaN/GaN as the two-dimensional electron gas in the case where a magnitude of the two-dimensional electron gas is varied.

A graph relating to resistance-temperature characteristics of the two temperature sensors, which are different in size but are the same ratio of length-to-width of the two-dimensional electron gas, is shown in FIG. 3. Specifically, FIG. 3 shows the resistance-temperature characteristics of both the two-dimensional electron gas of 10 micrometers width by 30 micrometers length and the two-dimensional electron gas of 50 micrometers width by 150 micrometers length. As the two-dimensional electron gas, the heterostructure of the AlGaN/GaN system is used. As shown in the figure, it can be understood that the temperature sensor of the present invention has almost the same characteristics even if the sizes of the two-dimensional electron gases are different. Therefore, the temperature sensor of the present invention has high general versatility because the size of the temperature sensitive region can be set voluntarily.

Figure 4:
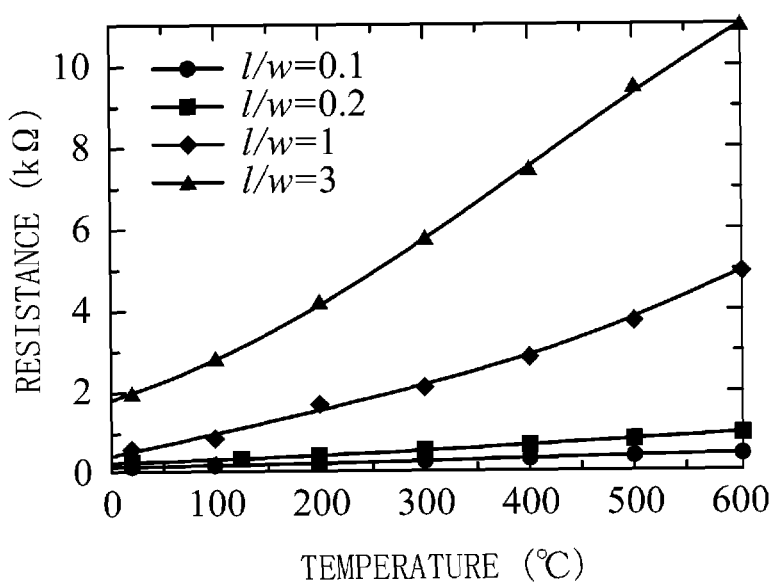
FIG. 4 is a graph showing resistance-temperature characteristics of the temperature sensor according to the invention in the case where the ratio of length-to-width of the two-dimensional electron gas is varied.

Further, a graph relating to resistance-temperature characteristics in the case where the ratio of length-to-width of the two-dimensional electron gas is varied is shown in FIG. 4. Specifically, FIG. 4 shows the variation of the characteristics for ratio 1/w of length-to-width of each 0.1, 0.2, 1 and 3. As the two-dimensional electron gas, the heterostructure of the AlGaN/GaN system is used. As shown in the figure, it can be understood that the larger the ratio 1/w is, the larger the increase ratio of the resistance is. Therefore, the measurement sensitivity can be controlled by varying the ratio of length-to-width of the sensor. That is, if enhancing the measurement sensitivity, the sensor width may be shortened and the sensor length may be elongated. However, when the sensor length is too long, the resolution performance decreases. Therefore, it should be designed in accordance with the intended use.

Figure 5:
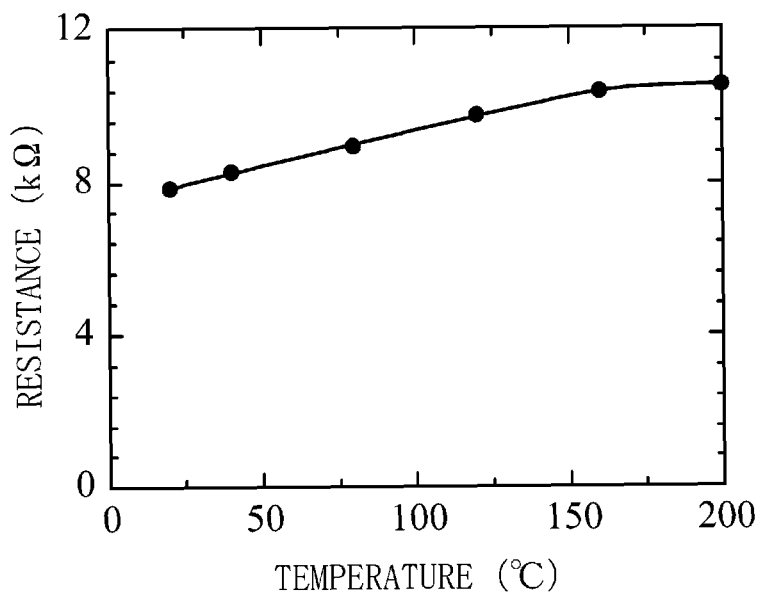
FIG. 5 is a graph showing resistance-temperature characteristics of the temperature sensor according to the invention, which uses AlGaAs/GaAs as the two-dimensional electron gas.

The characteristics of the temperature sensor in which a material of an AlGaAs/GaAs system is used as other two-dimensional electron gas are shown in FIG. 5. FIG. 5 is a graph relating to resistance-temperature characteristics in the case where the heterostructure of AlGaAs/GaAs is used as the two-dimensional electron gas. Even though the operating temperature limit of the AlGaAs/GaAs system is narrower than that of the AlGaN/GaN system, the sensor has characteristics which increase depending on rise of temperature. Regarding the illustrated temperature range and resistance, those are also variable in accordance with doping to the temperature sensor to be formed, therefore it should be understood that those are not limited to the illustrated example.

When such a material having rather low physical strength as AlGaAs/GaAs is used, it should be understood that the physical strength could be enhanced by forming a protective film of SiN etc. on the contact region with a region to be measured of the temperature sensor if desired. The position of the contact region being in contact with the region to be measured may be, for example, on a surface or a sidewall of the sensor. A physically and chemically stable temperature sensor can be obtained by covering through the protective film the region being in contact with the region to be measured.

Figure 6:
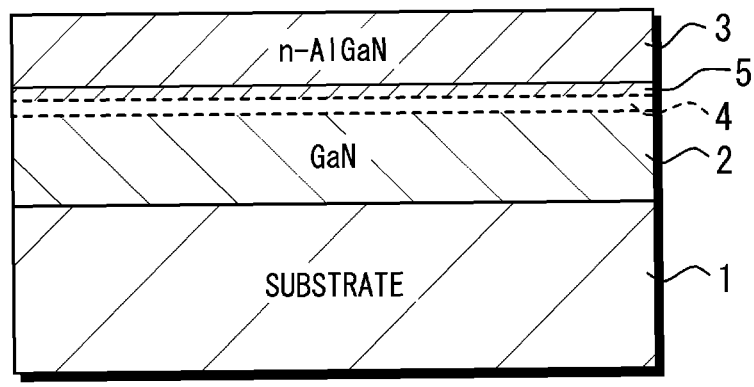
FIG. 6 is a schematic sectional view for describing a high-temperature-tolerant structure of the temperature sensor according to the present invention.

The operation of the temperature sensor using the heterostructure of AlGaN/GaN may be tolerant to a rather high temperature. However, when the temperature sensor uses at a higher temperature, electrons in a quantum well are excited and cross over an energy barrier between AlGaN and GaN. Thus, the temperature sensor cannot operate at the higher temperature. The structure of the temperature sensor operable at a higher temperature to overcome such problem is shown in FIG. 6. FIG. 6 is a schematic sectional view for describing a high-temperature-tolerant structure of the temperature sensor of the present invention. The same elements as those in FIG. 1 are depicted with the same reference numerals. This temperature sensor has a structure in which a thin barrier layer is provided between a supply layer and a smaller band gap layer than the supply layer. That is, an AlN layer 5 is used as the thin barrier layer, which is provided between the AlGaN layer 3 used as the supply layer and the GaN layer 2 used as the smaller band gap layer. The film thickness of the barrier layer may be from about 1 nm to 2 nm. Since the energy barrier can be made high, the thermal excitation of electrons to AlGaN can be prevented even at high temperature. Therefore, a temperature sensor operable at a high temperature can be obtained.

In addition, the temperature sensor of the present invention may not only be a contact-type sensor, but also be a noncontact-type sensor.

Further, the temperature sensor of the present invention may have a high carrier density by optical excitation at a low temperature. This enables the electrical conductivity to be made high even at a low temperature. As a result, the temperature measurement sensitivity is enhanced.

By using the temperature sensor of the present invention explained heretofore, the surface temperature distribution of an object to be measured can also be measured by scanning the surface thereof. According to the invention, since the response speed of the temperature sensor is high, the scan speed can also be made high. Further, a plurality of temperature sensors of the present invention can be disposed in a matrix form to measure a plurality of points at a time.

Also, the temperature sensor of the present invention may be made by using various kinds of semiconductor manufacturing methods. Therefore, the temperature sensors with any sizes and shapes can be formed by such a fine processing technology as MEMS.

Further, the temperature sensor of the present invention may be constituted to use a resistance of a two-dimensional electron gas in a magnetic field transducer such as a Hall element and a magnetoresistive element. That is, the magnetic field transducer is formed by using a heterostructure of AlGaN/GaN etc., so that the sensor measures a temperature by using the resistance of the two-dimensional electron gas formed at the interface therebetween as well as measuring a magnetic field. In addition, since an output signal from the magnetic field transducer may be changed depending on not only a magnetic field but also a temperature, it cannot be determined whether the change of the output signal is influenced by the temperature or the magnetic field. Therefore, the measurement may be carried out after offsetting under a reference temperature or a reference magnetic field before the measurement.

The temperature sensor of the present invention may also be adapted to a device such as a scanning probe microscope using a very minute probe for examining a fine surface of a material. That is, the temperature sensor of the present invention is provided to the probe tip, so that the device which can measure a surface temperature as well as physical information such as a surface texture and a magnetic field distribution is realizable. If the probe tip is made from a semiconductor, since the temperature sensor of the present invention can be formed into the probe tip by the semiconductor manufacturing process together, a temperature of nearly the same region as the measured point of the physical information can be measured.

While the invention has been described in its preferred embodiments, it is to be understood that the words which have been used are words of description rather than limitation and that changes within the purview of the appended claims may be made without departing from the true scope of the invention as defined by the claims. The layer structure should not be limited to the illustrated example and may include other layer as long as a temperature is measured by using a resistance of a two-dimensional electron gas. It may also utilize a HEMT (High Electron Mobility Transistor), etc. which uses the two-dimensional electron gas.

The invention claimed is:

1. A temperature sensor comprising a two-dimensional electron gas, wherein a resistance of said two-dimensional electron gas is used to measure a temperature, and wherein the temperature sensor is subjected to optical excitation.

2. The temperature sensor according to claim 1, further comprising a protective film formed on a contact region of said temperature sensor.

3. The temperature sensor according to claim 2, wherein the protective film comprises silicon nitride (SiN).

4. The temperature sensor according to claim 1, wherein said two-dimensional electron gas has a heterostructure selected from the group consisting of an AlGaN/GaN system, an AlGaAs/GaAs system, an InAs/GaAs system, an InAs/GaSb/AlSb system, a SiGe/Si system, a SiC/Si system, a CdTe/HgTe/CdTe system, an InGaAs/InAlAs/InP system, and nanocrystalline silicon.

5. The temperature sensor according to claim 1, wherein said two-dimensional electron gas has a heterostructure of an AlGaN/GaN system, said temperature sensor further comprising a thin barrier layer provided between a supply layer and a smaller band gap layer than said supply layer of said heterostructure.

6. The temperature sensor according to claim 5, wherein the thin barrier layer comprises aluminum nitride (AlN), and wherein the thin barrier layer has a thickness of between approximately 1 nanometer (nm) and approximately 2 nm.

7. The temperature sensor according to claim 1, wherein said temperature sensor has a plurality of sensors disposed in a matrix form.

8. The temperature sensor according to claim 1, wherein said temperature sensor further comprises a magnetic field transducer.

9. The temperature sensor according to claim 1, wherein the temperature sensor is configured to detect temperatures between absolute zero and 600 degrees Celsius.

10. The temperature sensor according to claim 1, further comprising:
a substrate; and
a first layer that is adjacent to the substrate.

11. The temperature sensor according to claim 10, wherein the first layer is deposited onto the substrate by way of crystal growth.

12. The temperature sensor according to claim 10, wherein the first layer comprises gallium nitride (GaN).

13. The temperature sensor according to claim 10, further comprising a second layer adjacent to the first layer.

14. The temperature sensor according to claim 13, wherein the second layer comprises aluminum gallium nitride (AlGaN).

15. The temperature sensor according to claim 14, wherein the AlGaN comprises n-type AlGaN.

16. The temperature sensor according to claim 13, wherein the second layer is deposited onto the first layer by way of crystal growth.

17. The temperature sensor according to claim 13, wherein the two-dimensional electron gas is positioned at an interface between the first layer and the second layer.

18. The temperature sensor according to claim 1, further comprising one or more ohmic contacts through which the resistance of the two-dimensional electron gas is measured.

19. The temperature sensor according to claim 1, wherein the two-dimensional electron gas is positioned at a depth of approximately 30 nanometers (nm) from a surface of the temperature sensor.

20. The temperature sensor according to claim 1, wherein the temperature sensor is incorporated into a probe tip of a scanning probe microscope.

* * * * *

UNITED STATES PATENT AND TRADEMARK OFFICE
CERTIFICATE OF CORRECTION

| | | |
|---|---|---|
| PATENT NO. | : 8,449,180 B2 | Page 1 of 1 |
| APPLICATION NO. | : 12/161760 | |
| DATED | : May 28, 2013 | |
| INVENTOR(S) | : Sandhu et al. | |

It is certified that error appears in the above-identified patent and that said Letters Patent is hereby corrected as shown below:

In the Specifications:

In Column 4, Line 13, delete "degree" and insert -- degrees --, therefor.

In the Claims:

In Column 6, Line 52, in Claim 6, delete "(AlN)," and insert -- (AlN), --, therefor.

Signed and Sealed this
Twenty-seventh Day of August, 2013

Teresa Stanek Rea
*Acting Director of the United States Patent and Trademark Office*